(12) United States Patent
Zinsen

(10) Patent No.: US 6,759,622 B1
(45) Date of Patent: Jul. 6, 2004

(54) INTERCONNECTION BETWEEN TWO-SURFACE OF MULTI-SURFACE THIN STRIP-SHAPED LAYERS THAT LIE ONE ON TOP OF THE OTHER, IN PARTICULAR, BETWEEN TWO STRIPS UNDERGOING A CONTINUOUS PROCESSING

(75) Inventor: Peter Zinsen, Stolberg (DE)

(73) Assignee: Prymetall GmbH & Co. KG, Stolberg (DE)

( * ) Notice: Subject to any disclaimer, the term of this patent is extended or adjusted under 35 U.S.C. 154(b) by 148 days.

(21) Appl. No.: 10/149,257
(22) PCT Filed: Oct. 14, 2000
(86) PCT No.: PCT/EP00/10130
§ 371 (c)(1),
(2), (4) Date: Jun. 7, 2002
(87) PCT Pub. No.: WO01/41951
PCT Pub. Date: Jun. 14, 2001

(30) Foreign Application Priority Data

Dec. 8, 1999 (DE) .......................................... 199 59 090

(51) Int. Cl.$^7$ .......................... B23H 7/02; B23K 37/00; B23K 31/00; B21D 39/00
(52) U.S. Cl. ................... 219/69.17; 219/80; 219/69.11; 228/5.7; 228/163; 228/149
(58) Field of Search ................................. 228/144, 149, 228/150, 159, 163, 212, 265, 5.7, 17.5; 219/59.1, 69.1, 69.11, 69.17, 79, 80, 82.1, 91.2, 91.23, 121.14, 121.17, 127; 29/17.1, 89.5

(56) References Cited

U.S. PATENT DOCUMENTS

| | | | |
|---|---|---|---|
| 4,391,037 A | * | 7/1983 | Giasini ........................ 29/716 |
| 4,611,381 A | | 9/1986 | La Barge et al. |
| 4,755,652 A | | 7/1988 | La Rocca |
| 5,082,160 A | * | 1/1992 | Leigh ...................... 228/110.1 |
| 6,579,626 B1 | * | 6/2003 | Ottinger et al. ............. 428/626 |

FOREIGN PATENT DOCUMENTS

| | | |
|---|---|---|
| EP | 0029415 | 5/1981 |
| GB | 291684 | 6/1928 |

* cited by examiner

Primary Examiner—Stanley S. Silverman
Assistant Examiner—Colleen P. Cooke
(74) Attorney, Agent, or Firm—Friedrich Kueffner

(57) ABSTRACT

The invention relates to an interconnection between two overlapping end sections of metallic strips (10, 20) in which a quick and economical interconnetion should be produced. To this end, the invention provides that several annular welds (30) are provided in the overlapping area (15) which are situated at a distance from the face ends of both strips (10, 20).

4 Claims, 1 Drawing Sheet

INTERCONNECTION BETWEEN TWO-SURFACE OF MULTI-SURFACE THIN STRIP-SHAPED LAYERS THAT LIE ONE ON TOP OF THE OTHER, IN PARTICULAR, BETWEEN TWO STRIPS UNDERGOING A CONTINUOUS PROCESSING

The invention concerns an interconnection of the type specified in the introductory clause of Claim 1. Coilable strips are continuously processed in sheet rolling mills or in annealing furnaces. They are located in the feed area of the mill in the form of a coil, pass through the mill, and, after they have been processed, they are rewound into a coil at the end of the mill. After the coil on the feed side has been used up, the end of the coil must be interconnected with the lead end of a fresh coil, which is then pulled through the various processing stations in the mill by the end of the first coil, as the latter continues to pass through the mill. At the end of the mill, the two strips can then be detached from one another. The finished strip can then be removed in coiled form, and, when the operation is resumed, the strip being pulled through the mill can be rewound into a coil at the end of the mill.

In the previously known equipment (U.S. Pat. No. 4,391,037), the two overlapping end sections are interconnected by means of a punching tool. The upper blade and lower blade of the punching tool make cross-shaped cuts in the two strips, and then the flaps located between two cross-shaped cuts are flanged in two layers. Due to the flanges, four layers are then positioned one above the other at the interconnection. This large thickness at the interconnections causes problems when the interconnected end sections are passed between the rolls of the mills that are processing the strip material. The interconnected punch sites have a rectangular shape, at whose rectangular corners a troublesome notch effect occurs under stress, which reduces the strength of the interconnection. The punching tools wear out after a certain amount of use and must be replaced, which is bothersome.

In addition, the production of the interconnection is time-consuming, because two stroke movements of the tool are necessary at each interconnecting site, specifically, the cutting of the two strips in a first operational phase and then flattening and pressing during the flanging of the edges of the holes in a second operational phase. Similar problems are encountered with all interconnections operating with similar stitching machines (SU 1,590,168 A1), where cross-shaped openings are formed in the overlapping end sections of the strips.

In the case of processing machines for narrow strip products made of metallic materials, it is well known that successive strips can be butt-welded. This makes it possible to obtain a flat product in the region of the interconnection, which can be passed through the processing machine without any problems. However, the welding of the interconnection changes the material properties of the product at the interconnection site. The interconnection site may be subjected to only moderate stresses.

The goal of the invention is to develop an inexpensive interconnection of the type specified in the introductory clause of Claim 1, which can be quickly produced, has a low overall height and is very strong. In accordance with the invention, this goal is achieved by the measures specified in the characterizing clause of Claim 1, which have the special significance described below.

The invention recognized that the annular welds in accordance with the invention are subject to loads on all sides. Accordingly, these welds are distinguished by high strength of the resulting interconnection under tensile loads and compressive loads. In diametric layers on all sides, i.e., including the longitudinal direction of the strip, two welds are present in an annular weld of this type, which reliably hold the position of the two layers of strips in the overlapping region flat against each other. The passage of this interconnection through processing mills with so-called S-rolls avoids the risk of the free edges turning up, even though the annular welds are located at a distance from the face ends of the two strips. The annular welds in accordance with the invention can be produced quickly and economically. The annular welds immediately withstand high tensile and compressive loads.

The annular welds may have any desired contour profile, e.g., longitudinally oval or triangular. There is no danger that the annular welds will cause notch effects, even if an angular contour profile is used. Longitudinal loads and transverse loads are immediately transmitted by the annular welds from one strip to the other without damage. A circular profile has been found to be an especially effective contour profile of the annular welds. In addition, it is recommended that the welds be formed with a hole inside the ring. The strip material at the edge around the hole then flows together to produce an especially strong interconnection between the two strips.

Other measures and advantages of the invention are specified in the subclaims and are described below with reference to the drawings.

Figure 1:
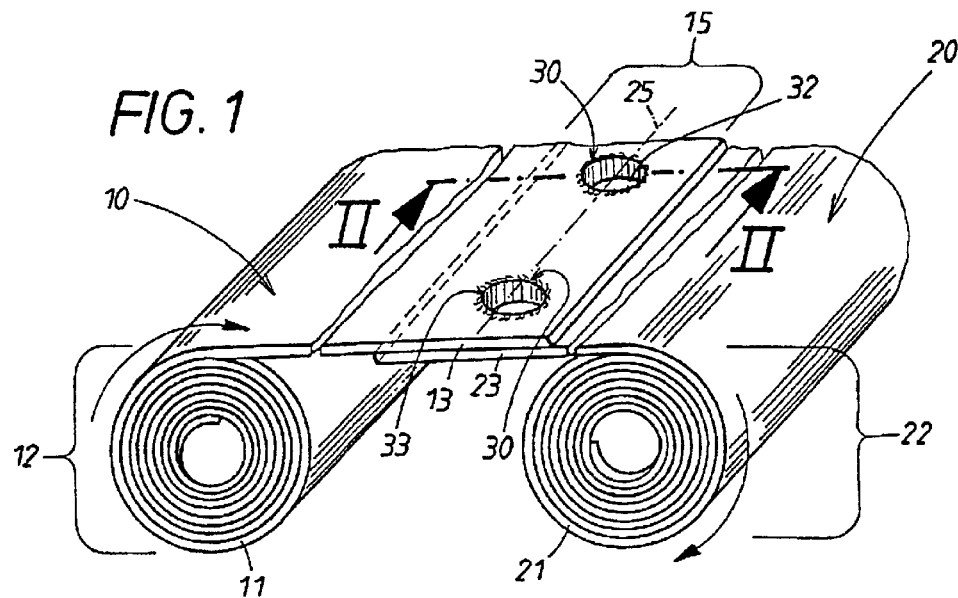
FIG. 1 is a schematic partial section that shows a boundary section between two coils with two interconnecting sites in accordance with the invention.

Two strips 10, 20, which may consist of metallic strip materials 11, 21 that are different from each other, pass through a mill (not shown), in which the strip material 11, 21 is being processed. The strips 10, 20 are present in the form of coils 12, 22, which are located at the beginning and end of the mill. The problem, therefore, is to interconnect their end sections 13, 23 in a particular way. To this end, the two end sections are placed flat one above the other to form an overlap zone 15. This operational step is shown in FIG. 3.

Figure 2:
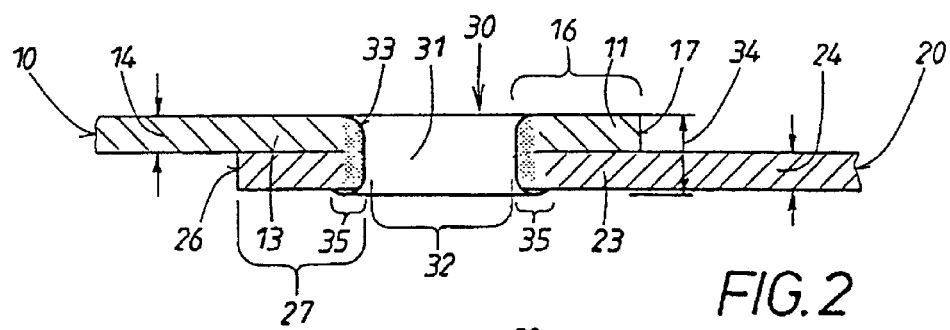
FIG. 2 shows an enlarged section through a portion of the interconnection region along sectional line II—II in FIG. 1.
Figure 3:
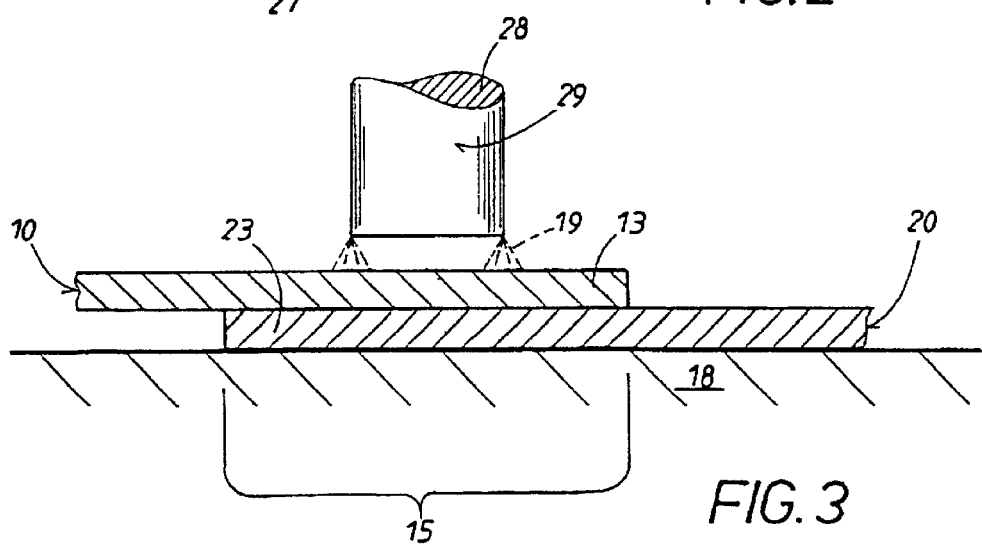
FIG. 3 shows the interconnection region of FIG. 2 in a preceding operational step.

As shown in FIG. 3, the overlapping 15 of the two end sections 13, 23 is performed on a table 18, above which one or more electrodes 28 are positioned. In the case shown here, the electrodes 28 have a circular contour 29. A sufficiently large voltage is produced between the electrodes 28 and the table 18 to produce welding sparks 19 towards the two layers lying between them. This results in the product seen in FIG. 2.

This welding effect 19 produces an annular weld 30 at each site of action of the electrode 28. Due to the circular contour 29 of the electrode, the annular weld 30 has a circular shape 33. Other annular shapes 33 are conceivable and can be obtained merely by using electrodes 28 with a different contour profile 29. A hole 32 is formed in the interior 31 of the ring; the two layers of the strips 10, 20 are separated here. This occurs simply as a result of the two layers 13, 23 melting through. This causes the strip material 11, 12 to flow together into the region surrounding the edge 33 of the hole. This results in the formation of an extraordinarily strong material mixture 35, which is indicated by shading in FIG. 2. The overlap zone 15 can be relatively narrow. The small overall height 34 of the interconnection is worth noting. It consists essentially only of the sum of the thicknesses 14 and 24 of the two interconnected strips 10, 20. This is very favorable for the passage of the interconnected strips 10, 20 through the processing mill.

Due to the annular weld 30, double welds are always present between the two strips 10, 20 in all directions, which are located on a line in the corresponding diametric direction of view towards the annular shape. Therefore, there is always a double fastening of the two strips in diametrically opposite positions relative to each other at each annular weld 30. The annular welds are arranged relative to each other in a linear row indicated by line 25 in FIG. 1. The row 25 of annular welds 30 advantageously runs in the transverse direction of the strip. It is also possible to provide two staggered rows 25 of annular welds 30. This type of interconnection produced by annular welds 30 can be pulled through so-called S-rolls in the mill without any problem. The rubberized surfaces of these kinds of rolls are not damaged by the interconnection of the invention. In particular, the low overall height 34 of the interconnection is an advantage in this respect.

As FIG. 2 shows, the annular weld 30 is located at a distance 16 from the face end 16 of the first strip 10. The same is true of the second strip 20, because the face end 26 of strip 20 is located at a similar longitudinal distance 27 from the annular weld 30. Nevertheless, as was mentioned earlier, the overlap zone 15 is relatively narrow.

List of Reference Numbers

10 strip
11 strip material
12 coil
13 end section of 10
14 thickness of 10
15 overlap zone of 13, 23
16 face end of 10
17 distance between 16, 30
18 supporting table for 10, 20
19 welding spark at 16
20 another strip
21 strip material of 20
22 coil of 20
23 end section of 10
24 thickness of 20
25 row arrangement of 30
26 face end of 20
27 longitudinal distance between 26, 30
28 electrode
29 circular contour of 28
30 annular weld, interconnection
31 annular interior of 30
32 hole in 31
33 circular contour of 30, edge of hole
34 overall height of 30
35 fused material of 11 and 21 that has run together

What is claimed is:

1. Method of manufacturing an interconnection of two-surface or multi-surface, thin, strip-shaped layers (10, 20) made of metallic material (11, 21), which lie one above the other, especially of the overlapping end sections (13, 23) of two coilable strips (10, 20) during ongoing processing of the strips (10, 20) in continuously operating equipment, such as a sheet rolling mill or an annealing furnace, wherein interconnections (30) are provided at a distance (16, 27) from the face ends (17, 26) of the two strips (10, 20), characterized by the fact that several annular interconnections (30) are produced solely by welding between the two layers of strips (10, 20) in the overlap region (15), wherein a hole (32) is burned into the strip material (11, 21) of the two layers (10, 20) in the annular interior (31) of the annular welds (30).

2. Method in accordance with claims 1, characterized by the fact that the metallic material (11, 21) of the two strips (10, 20) flows together (35) at the edges of the annular welds around the hole (32).

3. Method in accordance with claim 1, characterized by the fact that the annular welds (30) are manufactured in at least one linear row (25), wherein the linear row (25) of annular welds (30) runs in the transverse direction of the strip.

4. Method in accordance with claim 1, characterized by the fact that the annular welds (30) are manufactured with a circular shape (33) during welding.

* * * * *